US012253273B1

(12) United States Patent
Dudek

(10) Patent No.: US 12,253,273 B1
(45) Date of Patent: Mar. 18, 2025

(54) HVAC MONITORING SYSTEM

(71) Applicant: Daniel Xavier Dudek, Flower Mound, TX (US)

(72) Inventor: Daniel Xavier Dudek, Flower Mound, TX (US)

( * ) Notice: Subject to any disclaimer, the term of this patent is extended or adjusted under 35 U.S.C. 154(b) by 234 days.

(21) Appl. No.: 17/567,488

(22) Filed: Jan. 3, 2022

Related U.S. Application Data

(60) Provisional application No. 63/133,975, filed on Jan. 5, 2021.

(51) Int. Cl.

| | |
|---|---|
| ***F24F 11/30*** | (2018.01) |
| ***F24D 19/10*** | (2006.01) |
| ***F24F 11/52*** | (2018.01) |
| ***F24F 110/12*** | (2018.01) |
| ***F25B 49/02*** | (2006.01) |
| ***G08B 21/18*** | (2006.01) |

(52) U.S. Cl.
CPC .......... *F24F 11/30* (2018.01); *F24D 19/1084* (2013.01); *F24F 11/52* (2018.01); *F25B 49/02* (2013.01); *G08B 21/18* (2013.01); *F24F 2110/12* (2018.01); *F25B 2500/222* (2013.01); *F25B 2700/21163* (2013.01)

(58) Field of Classification Search
CPC ........ F24F 11/30; F24F 11/52; F24F 2110/12; F24D 19/1084; F25B 49/02; F25B 2500/222; F25B 2700/21163; G08B 21/18
See application file for complete search history.

(56) References Cited

U.S. PATENT DOCUMENTS

| | | | | |
|---|---|---|---|---|
| 6,385,510 | B1 | 5/2002 | Hoog et al. | |
| 9,168,315 | B1 | 10/2015 | Scaringe | |
| 9,638,436 | B2 | 5/2017 | Arensmeier et al. | |
| 10,753,630 | B2 * | 8/2020 | Rupp | F24F 11/30 |
| 10,982,862 | B1 * | 4/2021 | Kaiser | F24H 3/12 |
| 11,009,245 | B2 | 5/2021 | Rupp et al. | |
| 2005/0125102 | A1 | 6/2005 | Nichols et al. | |
| 2005/0240312 | A1 | 10/2005 | Terry et al. | |
| 2014/0074730 | A1 | 3/2014 | Arensmeier et al. | |
| 2017/0042049 | A1 * | 2/2017 | DePompeo | H01B 7/292 |
| 2020/0103293 | A1 * | 4/2020 | Rud | G01K 7/427 |
| 2022/0090979 | A1 * | 3/2022 | Kester | G01M 3/24 |
| 2022/0186997 | A1 * | 6/2022 | Goel | F25B 39/02 |
| 2022/0390292 | A1 * | 12/2022 | Roghanizad | A61B 5/015 |

FOREIGN PATENT DOCUMENTS

SG 10201602430P A * 4/2016

* cited by examiner

*Primary Examiner* — Curtis A Kuntz
*Assistant Examiner* — James E Munion
(74) *Attorney, Agent, or Firm* — Kenneth L. Tolar

(57) ABSTRACT

An HVAC monitoring system includes a base unit mounted on a condenser and/or furnace that is electrically connected to a plurality of thermistors positioned at specific locations critical to efficient operation of the system. The base unit is in discrete wireless communication with a receiver positioned within the building interior where it is readily accessible and observable by the occupant. The receiver includes a display screen with indicators that visually inform a user of an alert condition.

32 Claims, 4 Drawing Sheets

HVAC MONITORING SYSTEM

CROSS REFERENCE TO RELATED APPLICATIONS

This application claims priority of provisional application No. 63/133,975 filed on Jan. 5, 2021, the specification of which is incorporated herein by reference.

BACKGROUND OF THE INVENTION

The present invention relates to a system that monitors temperatures at critical locations in a condenser unit or furnace and wirelessly transmits the measurements to a display to quickly identify system problems.

DESCRIPTION OF THE PRIOR ART

Proper maintenance of an HVAC system is critical to maintaining reliability and longevity. When an HVAC component begins to fail, the efficiency of the entire system will deteriorate, often with no immediate warnings or alerts. If a failing component is not quickly repaired, the entire system may be irreparably damaged. Replacing the entire system is extremely expensive, burdensome, and aggravating, particularly if the replacement could have been avoided by timely correcting a minor problem.

Furthermore, EPA guidelines and regulations, such as the Clean Air Act, require any person who penetrates the refrigerant circuit of an HVAC system during maintenance, repair, or service to be certified to handle refrigerants. Therefore, invasive monitoring equipment, i.e., that which penetrates the refrigerant system, must be installed, or replaced by a certified technician, which is costly and inconvenient.

EPA guidelines also require that owners of any appliance containing 50 or more pounds of ozone-depleting refrigerant that leaks 10% or more of the full charge in a calendar year for comfort cooling systems, and 20% of the full charge for commercial systems, may be subject to recordkeeping and reporting requirements of the EPA, and must identify leaks and repair or replace the appliance. Therefore, monitoring and tracking refrigerant leaks is a critical feature of any HVAC system. Currently, leak monitoring is typically done with invasive pressure-sensor probes or by piercing refrigerant valves, which require a certified technician to install, service, and repair.

Accordingly, there is currently a need for a device that continuously monitors an HVAC system and alerts an owner of potential performance problems. There is also currently a need for an HVAC monitoring system that can be conveniently installed and serviced by a homeowner or other lay person who is not EPA certified.

A review of the prior art reveals a number of HVAC monitoring systems. For example, U.S. Pat. No. 9,168,315 to Scaringe discloses a diagnostic monitoring system for air conditioners and heaters. Voltage and current sensors are positioned on an outdoor condenser to verify that the vapor compression system is operating properly. Temperature sensors are also placed on the inlet and outlet of a compressor received within the condenser unit. Data received from the sensors is wirelessly transmitted to a remote unit monitored by a supervisor. Though the device monitors certain parameters of a condenser unit, a certified technician is required to interpret data and to remove the fan to install the temperature sensors. Furthermore, because compressor outlet temperatures are very high, an expensive, durable temperature probe with specialized heat-resistant electronics and a fortified protective shell is required.

U.S. Pat. No. 9,638,436 to Arensmeier et al. discloses an HVAC remote diagnostic system comprising a monitor for measuring aggregate current supplied to the HVAC components to assess component failure.

U.S. published patent application 2005/0125102 to Nichols et al. discloses an HVAC monitoring system including a plurality of sensors that communicate with a first computer to warn of potential operating problems. The sensors could include several temperature sensors positioned at the return air duct, at the supply air duct, outdoors for measuring ambient temperature, on the A/C liquid line, on the A/C suction line, and on the fan motor. The system also includes a pressure sensor positioned on both sides of the air filter, liquid sensors in the evaporator pan and the floor drain, and a humidity sensor for determining relative humidity of the return air.

U.S. patent publication 2005/0240312 to Terry discloses an HVAC monitoring system including temperature sensors outside, inside, on the condenser coil, and on the compressor. The system may also include a microcontroller and an algorithm to evaluate a combination of trend data to identify, diagnose and report operation that is outside an acceptable range.

U.S. Pat. No. 11,009,245 issued to Rupp discloses a method of remotely and proactively diagnosing an HVAC system that monitors pressure sensors and temperature sensors on a suction line, on a liquid line at the condenser outlet, at the AC compressor, at the suction line of an evaporator, and outdoors for measuring a temperature of ambient air. As with most conventional HVAC monitoring systems, the system requires remote licensed technicians to interpret data, diagnose issues and install.

U.S. Pat. No. 6,385,510 issued to Hoog et al. discloses an electronic HVAC monitoring computer including temperature sensors placed at various locations.

The present invention overcomes the disadvantages of prior-art monitoring systems by using non-invasive surface-mounted temperature sensors that do not penetrate a refrigerant system. The system uses the various temperature readings to assess a wide range of system performance criteria that are readily transmitted to a user-accessible display. For example, the system determines a differential between liquid refrigerant temperature and ambient air temperature to calculate the leak rate of refrigerant without using invasive pressure probes or similar instruments. Furthermore, refrigerant access points are covered by an electronic valve cap that alerts a user if someone is tampering with a refrigerant line. All measurements are wirelessly transmitted to a receiver mounted within the building interior to readily notify the occupant of an unacceptable condition.

SUMMARY OF THE INVENTION

The present invention relates to an HVAC monitoring system including a base unit mounted on a condenser and/or furnace. The base unit is electrically connected to a plurality of temperature sensors positioned at specific locations critical to efficient operation of the system. The base unit is in discrete wireless communication with a receiver positioned within the building interior where it is readily accessible and observable by the occupant. The receiver includes a display screen with indicators and menus that visually inform a user of an alert condition.

It is therefore an object of the present invention to provide a monitoring system that quickly identifies operating problems in an HVAC system.

It is therefore another object of the present invention to provide an HVAC monitoring system that measures temperatures at critical areas and wirelessly transmits the measurements to a receiver that is readily visible to the building occupant.

It is therefore yet another object of the present invention to provide an HVAC monitoring system that preemptively detects system failures.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
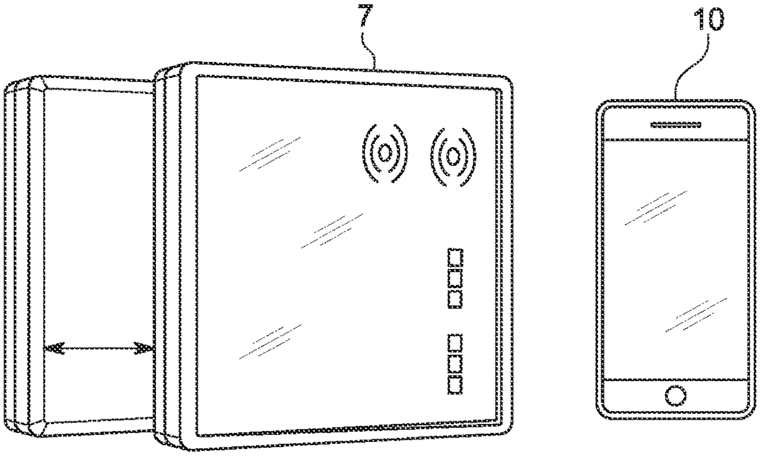
FIG. 1 depicts the receiver and smart phone of the HVAC monitoring system according to the present invention.
Figure 2:
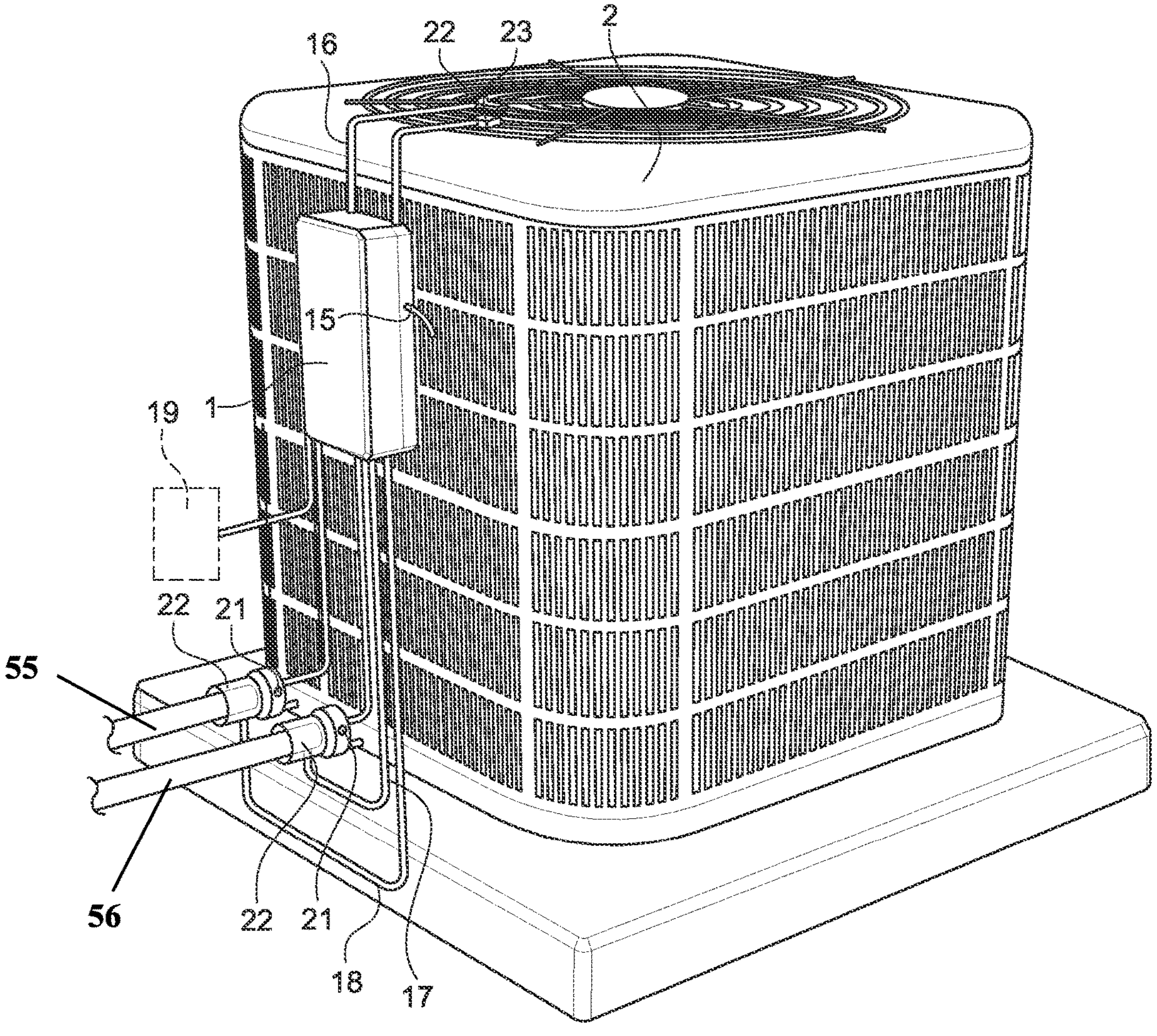
FIG. 2 depicts the HVAC monitoring system according to the present invention installed on a condenser.
Figure 3:
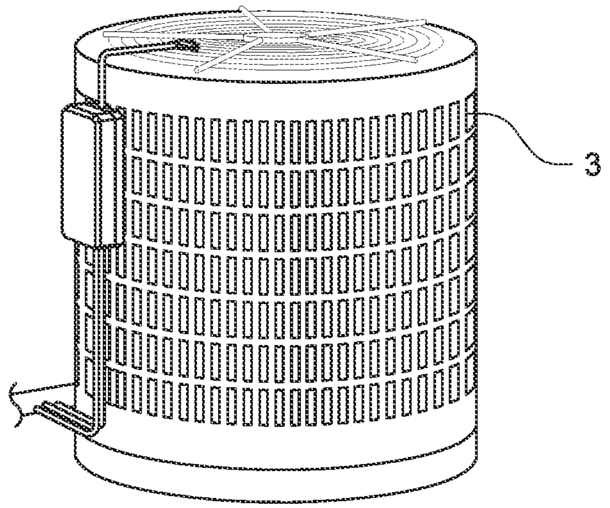
FIG. 3 depicts the HVAC monitoring system installed on a heat pump.

The present invention relates to an HVAC monitoring system including a base unit 1 mounted on a condenser 2, a heat pump 3 and/or a furnace 4. The base unit includes a housing having control electronics (PCB) with a wireless transmitter received therein. A plurality of temperature sensors 5 are electrically connected to the internal electronics and the wireless transmitter. In the preferred embodiment, the temperature sensors 5 are surface-mounted linear temperature sensors that do not penetrate HVAC refrigerant arteries or instruments to prevent invasion of a refrigerant system. However, as readily apparent to those skilled in the art, thermistors or other similar equivalents may also be used.

Each temperature sensor 5 is positioned at specific locations that are critical to efficient operation of the system. For example, on a condenser 2, a first temperature sensor 17 could be positioned on the refrigerant suction line 56 while a second temperature sensor 18 could be positioned on the liquid refrigerant line 55. Preferably, the surface-mounted sensors are encapsulated by a reflective, cylindrical sleeve 22 having an internal layer of insulation for deflecting ambient radiant heat from sunlight to minimize errant temperature fluctuations that would hinder accurate performance assessments. Furthermore, refrigerant access points are covered by an electronic valve cap 21 that alerts a user if someone is tampering with a refrigerant line.

The base unit includes an external temperature sensor 15 for measuring ambient air temperature. The system calculates the differential between the liquid line 55 temperature and ambient air temperature to assess a potential refrigerant leak. Specifically, the greater the difference between the liquid refrigerant temperature and the ambient air temperature, the greater the refrigerant loss. The system accesses a reference table stored in local memory or on a server that correlates various possible temperature differentials to a percentage of refrigerant loss for a given SEER rating of a condenser. Preferably, the system is configured to automatically determine the SEER rating of a given unit by monitoring the behavior and logic state of input wiring from the thermostat 34 to the base unit. When the system detects a differential that represents an unacceptable refrigerant leak, i.e., 10%, the user is notified accordingly.

A temperature differential can also indicate poor fan performance or fouled coils that are not adequately expelling heat instead of a refrigerant leak. Accordingly, another temperature probe 16 near the condenser fan outlet allows the system to monitor fan performance. If the fan is operating properly, the user is first instructed to clean the coils. If an unacceptable differential is subsequently detected after cleaning, the system assumes a refrigerant leak and calculates a leak rate. Preferably, the system is programmed to initiate the leak calculations before sunrise when radiant heat and ambient air temperatures are lowest to minimize false or exaggerated calculations.

In order to filter and verify the leak rate calculations, one or more electronic refrigerant leak detectors 23 may be positioned adjacent the fan temperature sensor 16. Since the furnace is positioned within a stagnant environment where refrigerant is more easily detected, another leak detector 32 is positioned on the furnace or air handler if either includes an evaporator coil. If either the liquid-to-air temperature differential or the detector 23, 32 indicates a leak, the other can be assessed to validate the leak or to ignore false alarms. The detectors 23, 32 can also document the time when a smaller leak began that would have otherwise been undetected by the temperature differential calculation.

Figure 4:
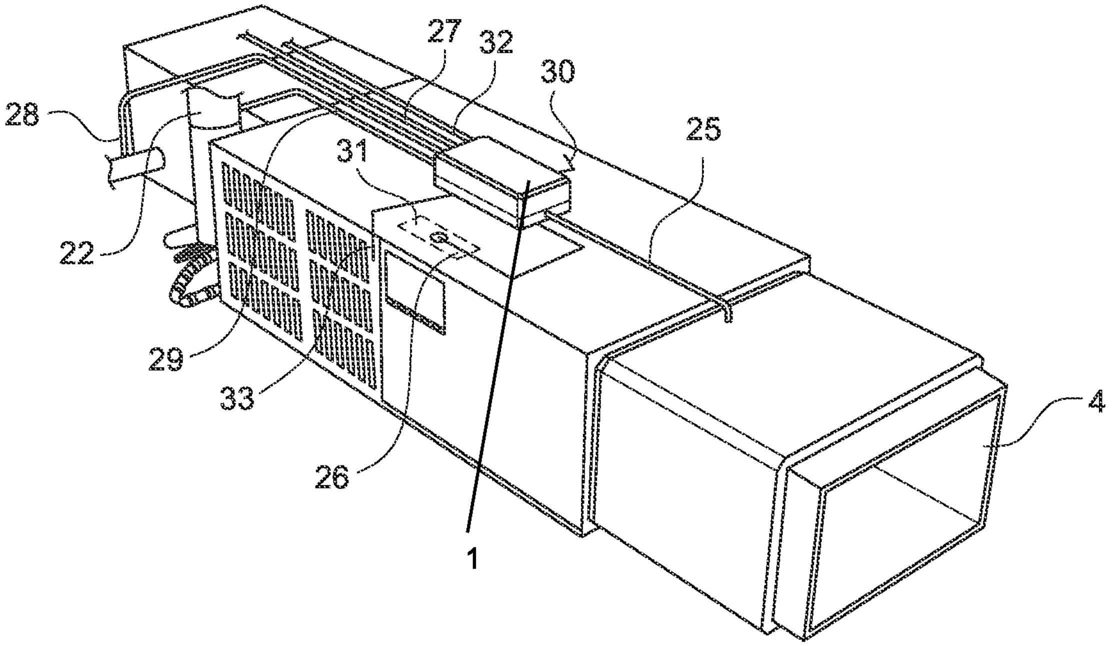
FIG. 4 depicts the HVAC monitoring system installed on a furnace.
Figure 5:
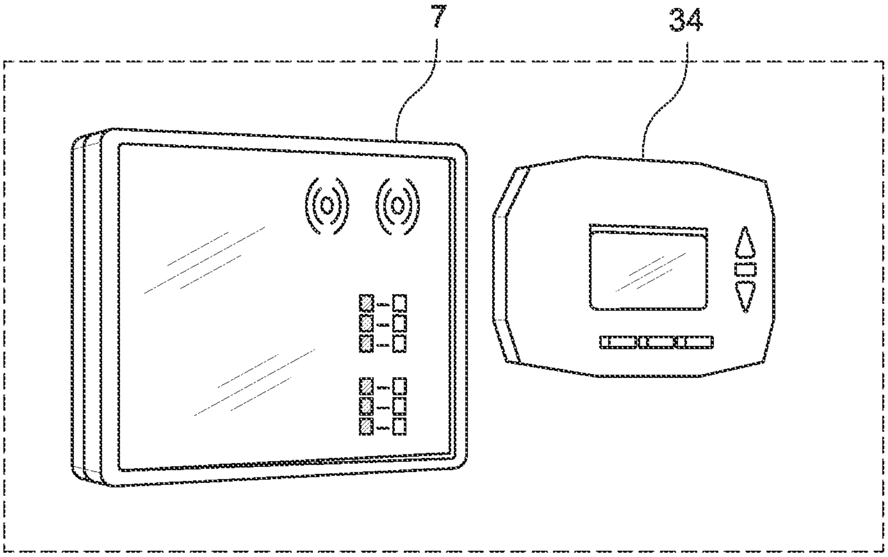
FIG. 5 is an isolated view of the receiver and an exemplary thermostat.

Now referring specifically to FIG. 4, the system could also be attached to a furnace 4 to further assess the overall performance of an HVAC system. A base unit 1 is attached to the furnace housing and electrically coupled with an interface 26 for providing furnace power to the internal electronics. As with the condenser unit, the base unit includes an ambient air temperature probe 30 for measuring ambient air temperature near the furnace. A first temperature sensor 25 is attached to the furnace air inlet and a second temperature probe 27 is secured to the air furnace outlet. A temperature probe 28 is coupled with the evaporator coil suction line while temperature probe 29 is also coupled with the furnace exhaust conduit to identify high-temperature alarm conditions. A natural gas leak detector 33 detects gas leaks that could quickly become a fire or explosion hazard if not immediately addressed. If so, the base unit transmits a distress signal to the receiver described, infra. The furnace temperature probes further assist the system with assessing overall environmental conditions that may negatively impact a leak calculation. For example, a hot attic can significantly affect the measured temperature of the evaporator suction line which would otherwise falsely indicate performance problems. Likewise, an ideal furnace exhaust temperature can vary according to SEER rating. Therefore, the system measures a number of available environmental conditions and compensates accordingly to eliminate false alarms.

Most existing HVAC systems include an interrupt switch 31 that disables system operation if condensate from the evaporator coils is accumulating within a plugged condensate pan other plumbing to prevent overflow conditions. If a potential clog is detected, the system is disabled until water accumulation subsides to a predetermined level at which time the system restarts. Repeated interruptions in service due to clogged condensate lines can result in inefficient operation and are usually undetectable unless a thorough inspection is performed. The base unit is electrically connected to the interrupt switch 31 and transmits an alert signal to the receiver to alert the user to initiate corrective action to quickly address a plugged condensate system.

All base units 1 are in discrete wireless communication with a receiver 7 positioned within the building interior where it is readily accessible and observable by the occupant. Preferably, the receiver 7 is positioned adjacent the HVAC system thermostat 34 for convenience. The receiver 7 includes a housing with a display screen 8 on the front surface and control electronics (PCB) with a wireless transmitter received therein that communicates with the base unit transmitter. The receiver 7 also includes a low-energy wireless communication module, such as that commonly marketed and sold under the trademark Bluetooth™. The low-energy wireless communication module allows interaction with a smart phone 10 or tablet-computer application. The receiver may also be Wi-Fi enabled to communicate with the building's internet network. The receiver further includes a microcontroller with specifically designed software having a filtering algorithm for interpreting artificial temperature spikes solely attributable to environmental conditions as indicated by the above-described sensors. The filtering algorithm also minimizes errors caused by extreme ambient temperature fluctuations within a given day. For example, in certain desert locations, daily temperatures can vary between a low of 70° F. and a high 110° F. The microcontroller software is preprogrammed with a target temperature range for each sensor that represents acceptable performance. Upon receipt of a temperature measurement, the microcontroller compares the filtered temperature with the target range to identify a potential problem.

A status screen depicted on the display includes an LED 11 that indicates the general overall operating condition of the system. The LED illuminates or pulses a white light if no problems are detected or a red light if an alert condition is detected. Upon detection of an alert condition, the system also activates a piezoelectric buzzer 13 to generate an audible alarm. The display screen separately depicts a pair of status indicators 14 for each temperature sensor, which are selectively illuminated, highlighted, or otherwise tagged to indicate acceptable or unacceptable operation. In addition, a technician with a smart phone and the application can remotely communicate with the receiver to identify a problem source without intruding into a residence or business.

The display may also be configured to depict a series of menus for displaying system performance. For example, a first menu could depict all condenser and furnace measurements and corresponding data calculations. A second menu could depict differences between acceptable and unacceptable measurements and any errors detected. Another menu could depict critical measurement differentials between the liquid line and ambient air, the liquid line and suction line, the condenser fan and condenser coil air inlet, the evaporator suction line outlet and condenser suction line inlet, the furnace air inlet and furnace air outlet, and the furnace exhaust and ambient air. Two additional menus could depict only furnace data or condenser data respectively. Another menu could depict logged service errors and required maintenance alerts.

Figure 6:
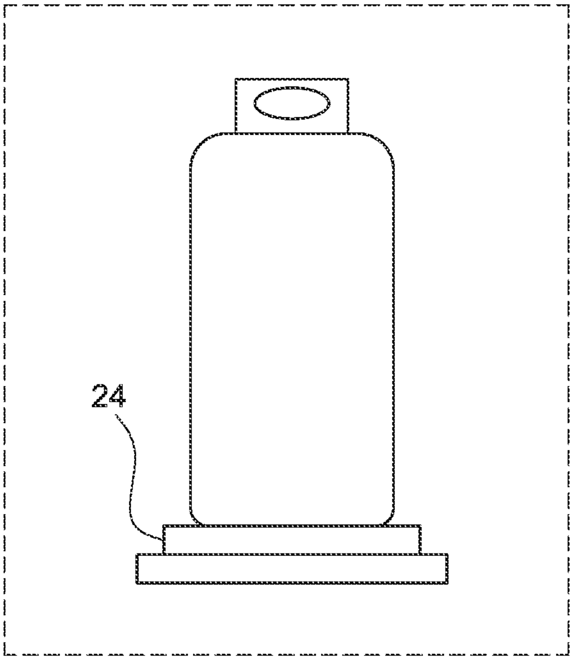
FIG. 6 is an isolated view of an exemplary connector for coupling a refrigerant weight scale to the base unit.
Figure 7:
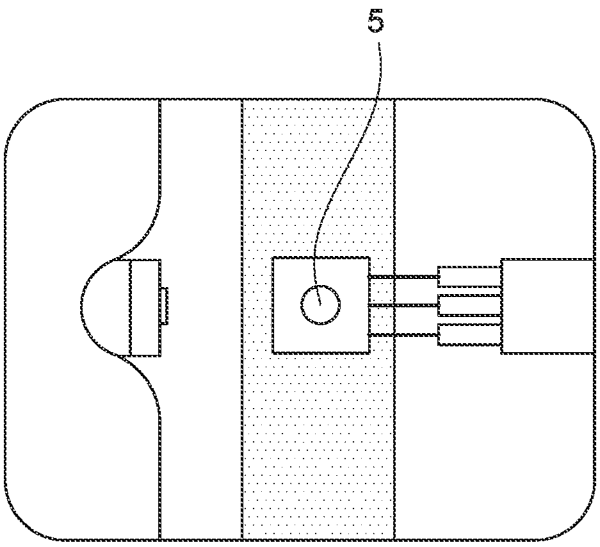
FIG. 7 depicts an exemplary linear temperature probe.
Figure 8:
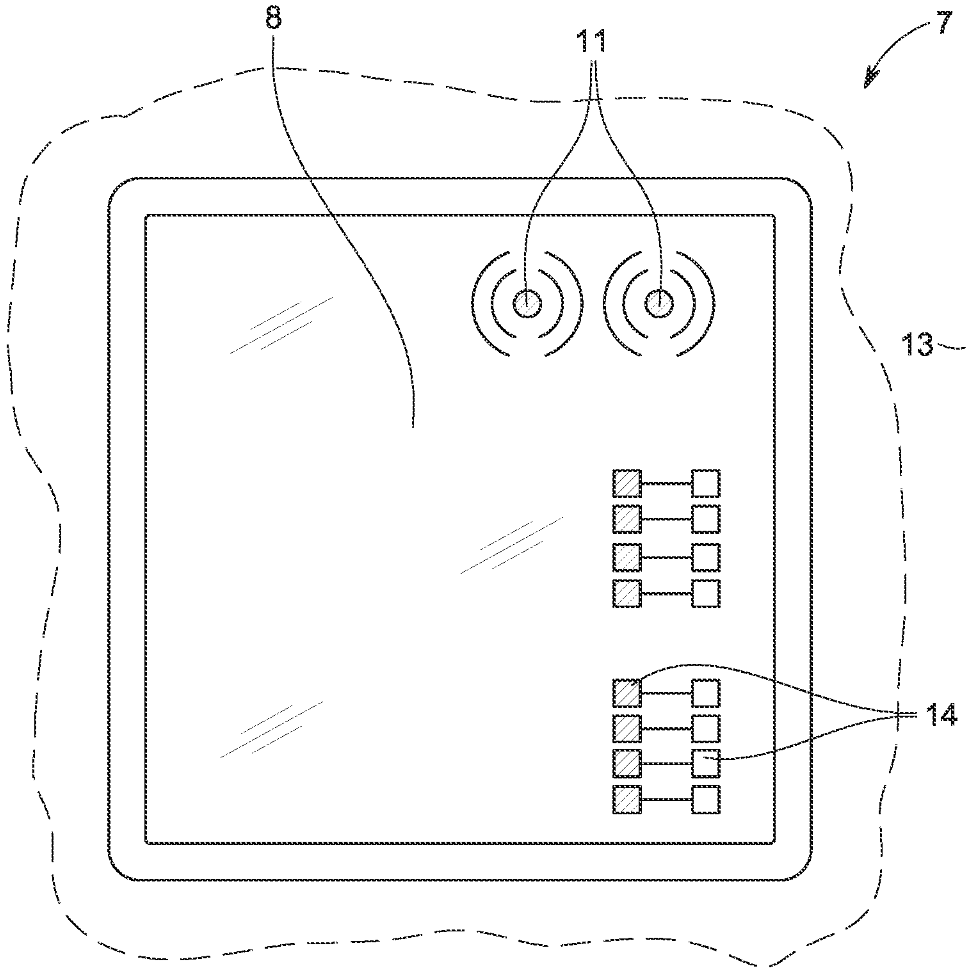
FIG. 8 is a front, plan view of the receiver.
Figure 9:
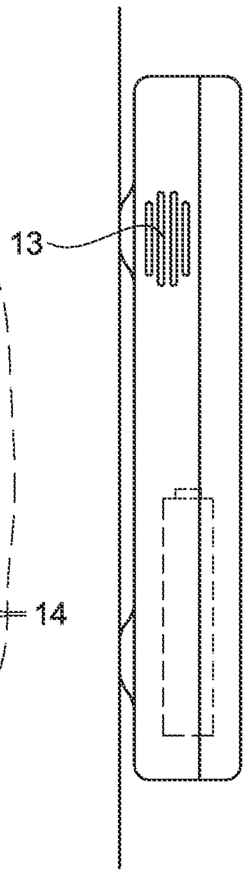
FIG. 9 is a side view of the receiver.

Now referring to FIG. 6, if a leak or any other repair requiring access to the refrigerant circuit is detected, a certified technician will be required to repair the leak by recovering the remaining refrigerant and likely adding additional refrigerant when the leak is repaired. The system transmits an alert to the receiver and to a technician's electronic device that a refrigerant weight scale must be connected to the condenser base unit with a connector 24 so that refrigerant weight can be transmitted to the receiver. The technician then places a refrigerant container on the scale and the system calculates the total amount of refrigerant removed or added, which is stored within a designated, easily accessible service record.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An HVAC monitoring system comprising:
- a condenser unit having a liquid refrigerant line, a refrigerant suction line, and a fan;
- a base unit mounted on said condenser unit;
- a first surface-mounted temperature sensor on said refrigerant suction line and electrically connected to said base unit;
- a second surface-mounted temperature sensor on said liquid refrigerant line and electrically connected to said base unit;
- an atmospheric temperature sensor mounted on said base unit and electrically connected to said base unit;
- a remote receiver in wireless communication with said base unit for processing and displaying output from said first surface-mounted temperature sensor, said second surface-mounted temperature sensor, and said atmospheric temperature sensor;
- a means for measuring a differential between a temperature measured by said second surface-mounted temperature sensor and said atmospheric temperature sensor and for calculating a refrigerant loss based upon said differential.

2. The HVAC monitoring system according to claim 1 wherein said first surface-mounted temperature sensor and said second surface-mounted temperature sensor are each encapsulated by a reflective, cylindrical sleeve having an internal layer of insulation for deflecting ambient radiant heat to assure accurate measurements.

3. The HVAC monitoring system according to claim 1 wherein said condenser unit includes at least one refrigerant access point covered by an electronic valve cap that alerts a user if someone is tampering with a refrigerant line.

4. The HVAC monitoring system according to claim 1 further comprising at least one electronic refrigerant leak detector proximal said fan for sensing a refrigerant leak.

5. The HVAC monitoring system according to claim 1 further comprising:
- a furnace having a second base unit mounted thereon;
- an ambient air temperature probe for measuring ambient air temperature near the furnace;
- a first temperature probe attached to a furnace air inlet;

a second temperature probe secured to an air furnace outlet;

a third temperature probe coupled with an evaporator coil suction;

a fourth temperature probe coupled with a furnace exhaust conduit to identify high-temperature alarm conditions.

6. The HVAC monitoring system according to claim 5 further comprising a natural gas leak detector for sensing natural gas leaks.

7. The HVAC monitoring system according to claim 5 wherein said second base unit is electronically connected to a condensate overflow interrupt switch on said furnace and transmits an alert signal to the receiver to alert the user to initiate corrective action.

8. The HVAC monitoring system according to claim 1 further comprising a fan temperature sensor proximal said fan for monitoring fan performance.

9. The HVAC monitoring system according to claim 5 further comprising at least one electronic refrigerant leak detector proximal an evaporator coil within said furnace for sensing a refrigerant leak.

10. The HVAC monitoring system according to claim 1 further comprising a means for filtering temperature fluctuations attributable to environmental conditions.

11. The HVAC monitoring system according to claim 8, wherein said fan temperature sensor is encapsulated by a reflective, cylindrical sleeve having an internal layer of insulation for deflecting ambient radiant heat to assure accurate measurements.

12. The HVAC monitoring system according to claim 10 wherein said means for filtering temperature fluctuations attributable to environmental conditions comprises said receiver having a microcontroller with software having a filtering algorithm for interpreting artificial temperature spikes solely attributable to environmental conditions.

13. An HVAC monitoring system comprising:

a condenser unit having a liquid refrigerant line, a refrigerant suction line, and a fan;

a base unit mounted on said condenser unit;

a first surface-mounted temperature sensor on said refrigerant suction line and electrically connected to said base unit;

a second surface-mounted temperature sensor on said liquid refrigerant line and electrically connected to said base unit;

an atmospheric temperature sensor mounted on said base unit and electrically connected to said base unit;

a remote receiver in wireless communication with said base unit for processing and displaying output from said first surface-mounted temperature sensor, said second surface-mounted temperature sensor, and said atmospheric temperature sensor;

at least one electronic refrigerant leak detector proximal said fan for sensing a refrigerant leak;

a furnace having a second base unit mounted thereon, wherein said second base unit is electronically connected to a condensate overflow interrupt switch on said furnace and transmits an alert signal to the receiver to alert the user to initiate corrective action;

an ambient air temperature probe for measuring ambient air temperature near the furnace;

a first temperature probe attached to a furnace air inlet;

a second temperature probe secured to an air furnace outlet;

a third temperature probe coupled with an evaporator coil suction;

a fourth temperature probe coupled with a furnace exhaust conduit to identify high-temperature alarm conditions.

14. The HVAC monitoring system according to claim 13 further comprising a means for measuring a differential between a temperature measured by said second surface-mounted temperature sensor and said atmospheric temperature sensor and for calculating a refrigerant loss based upon said differential.

15. The HVAC monitoring system according to claim 13 wherein said first surface-mounted temperature sensor and said second surface-mounted temperature sensor are each encapsulated by a reflective, cylindrical sleeve having an internal layer of insulation for deflecting ambient radiant heat to assure accurate measurements.

16. The HVAC monitoring system according to claim 13 wherein said condenser includes at least one refrigerant access point covered by an electronic valve cap that alerts a user if someone is tampering with a refrigerant line.

17. The HVAC monitoring system according to claim 13 further comprising a natural gas leak detector for sensing natural gas leaks.

18. The HVAC monitoring system according to claim 13 further comprising a fan temperature sensor proximal said fan for monitoring fan performance.

19. The HVAC monitoring system according to claim 13 further comprising at least one electronic refrigerant leak detector proximal an evaporator coil within said furnace for sensing a refrigerant leak.

20. The HVAC monitoring system according to claim 13 further comprising a means for filtering temperature fluctuations attributable to environmental conditions.

21. The HVAC monitoring system according to claim 18 wherein said fan temperature sensor is encapsulated by a reflective, cylindrical sleeve having an internal layer of insulation for deflecting ambient radiant heat to assure accurate measurements.

22. The HVAC monitoring system according to claim 20 wherein said means for filtering temperature fluctuations attributable to environmental conditions comprises said receiver having a microcontroller with software having a filtering algorithm for interpreting artificial temperature spikes solely attributable to environmental conditions.

23. An HVAC monitoring system comprising:

a condenser unit having a liquid refrigerant line, a refrigerant suction line, and a fan;

a base unit mounted on said condenser unit;

a first surface-mounted temperature sensor on said refrigerant suction line and electrically connected to said base unit;

a second surface-mounted temperature sensor on said liquid refrigerant line and electrically connected to said base unit; wherein said first surface-mounted temperature sensor and said second surface-mounted temperature sensor are each encapsulated by a reflective, cylindrical sleeve having an internal layer of insulation for deflecting ambient radiant heat to assure accurate measurements;

an atmospheric temperature sensor mounted on said base unit and electrically connected to said base unit;

a remote receiver in wireless communication with said base unit for processing and displaying output from said first surface-mounted temperature sensor, said second surface-mounted temperature sensor, and said atmospheric temperature sensor;

a means for filtering temperature fluctuations attributable to environmental conditions, wherein said means for filtering temperature fluctuations attributable to environmental conditions comprises said receiver having a microcontroller with software having a filtering algorithm for interpreting artificial temperature spikes solely attributable to environmental conditions.

24. The HVAC monitoring system according to claim 23 further comprising a means for measuring a differential between a temperature measured by said second surface-mounted temperature sensor and said atmospheric temperature sensor and for calculating a refrigerant loss based upon said differential.

25. The HVAC monitoring system according to claim 23 wherein said condenser includes at least one refrigerant access point covered by an electronic valve cap that alerts a user if someone is tampering with a refrigerant line.

26. The HVAC monitoring system according to claim 23 further comprising at least one electronic refrigerant leak detector proximal said fan for sensing a refrigerant leak.

27. The HVAC monitoring system according to claim 23 further comprising:

a furnace having a second base unit mounted thereon;

an ambient air temperature probe for measuring ambient air temperature near the furnace;

a first temperature probe attached to a furnace air inlet;

a second temperature probe secured to an air furnace outlet;

a third temperature probe coupled with an evaporator coil suction;

a fourth temperature probe coupled with a furnace exhaust conduit to identify high-temperature alarm conditions.

28. The HVAC monitoring system according to claim 27 further comprising a natural gas leak detector for sensing natural gas leaks.

29. The HVAC monitoring system according to claim 27 wherein said second base unit is electronically connected to a condensate overflow interrupt switch on said furnace and transmits an alert signal to the receiver to alert the user to initiate corrective action.

30. The HVAC monitoring system according to claim 23 further comprising a fan temperature sensor proximal said fan for monitoring fan performance.

31. The HVAC monitoring system according to claim 27 further comprising at least one electronic refrigerant leak detector proximal an evaporator coil within said furnace for sensing a refrigerant leak.

32. The HVAC monitoring system according to claim 30 wherein said fan temperature sensor is encapsulated by a reflective, cylindrical sleeve having an internal layer of insulation for deflecting ambient radiant heat to assure accurate measurements.

* * * * *